United States Patent

[11] 3,607,207

| [72] | Inventors | Franics A. Dahms<br>Tariffville, Conn.;<br>Thomas V. Foster, Witikon, Switzerland |
|---|---|---|
| [21] | Appl. No. | 800,165 |
| [22] | Filed | Feb. 18, 1969 |
| [45] | Patented | Sept. 21, 1971 |
| [73] | Assignee | Emhart Corporation<br>Bloomfield, Conn. |

[54] TRIPLE GOB MOLD HOLDER ARM CONSTRUCTION
1 Claim, 5 Drawing Figs.

[52] U.S. Cl. .................................................. 65/307,
65/323, 65/357, 65/359, 65/360, 65/361
[51] Int. Cl. ........................................................ C03b 11/16
[50] Field of Search .......................................... 65/361,
360, 307, 323, 357, 359

[56] References Cited
UNITED STATES PATENTS
646,948  4/1900  Brookfield et al. ............ 65/361 X

| 2,018,785 | 10/1935 | Harrison ........................ | 65/360 |
| 3,251,673 | 5/1966 | Brymer Jr. ..................... | 65/361 X |
| 3,268,322 | 8/1966 | Denman ........................ | 65/360 X |
| 3,472,639 | 10/1969 | Mumford ...................... | 65/360 X |

*Primary Examiner*—Frank W. Miga
*Attorney*—McCormick, Paulding & Huber

ABSTRACT: A Hartford I. S. type glassware-forming machine has a triple-gob section with a blow mold site having three individual split mold sections mounted on one primary mold holder arm and adapted to mate with three corresponding split mold sections on another primary arm to define three in-line mold cavities. One of the three split mold sections associated with each primary arm is mounted directly thereto, whereas the remaining two are mounted to a secondary arm which can float slightly in order to align all three of the cavity defining mold sections during closing movement of the primary mold holder arms.

3,607,207
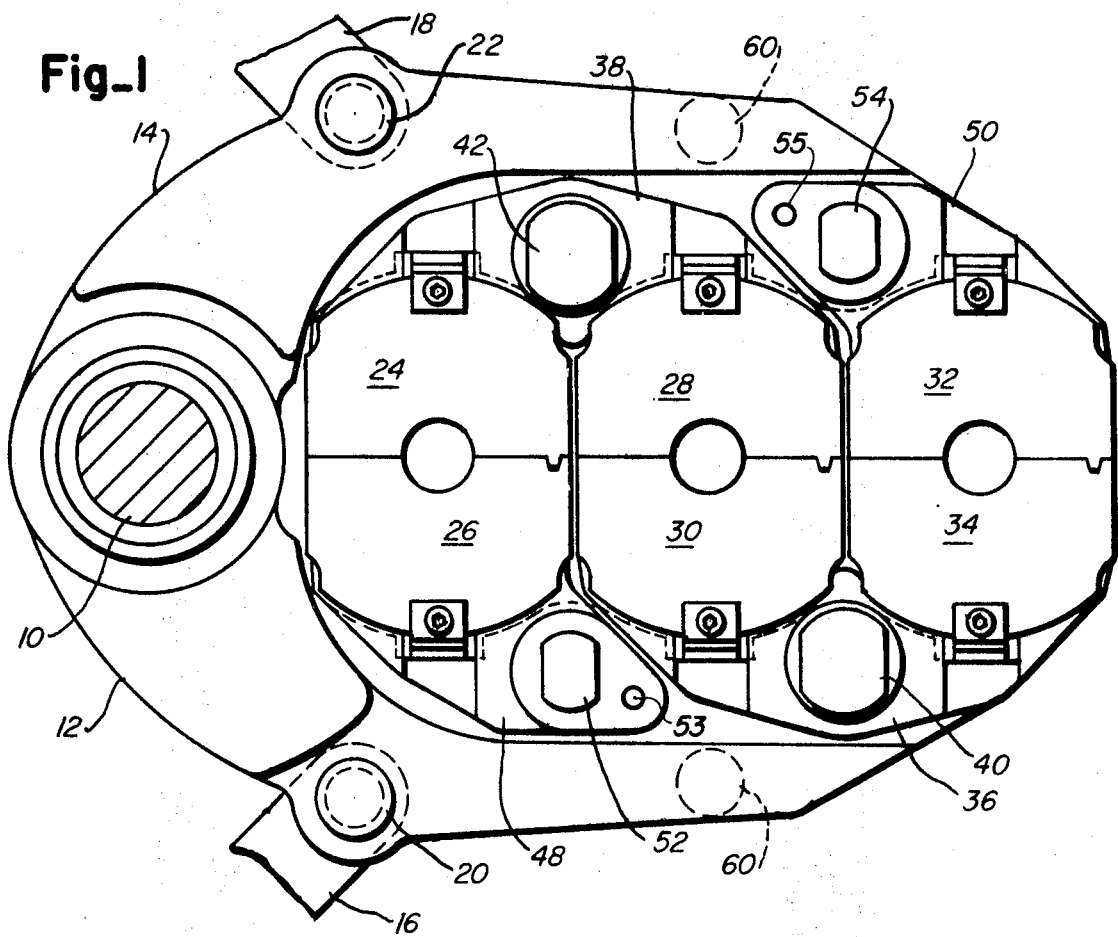
Fig_1
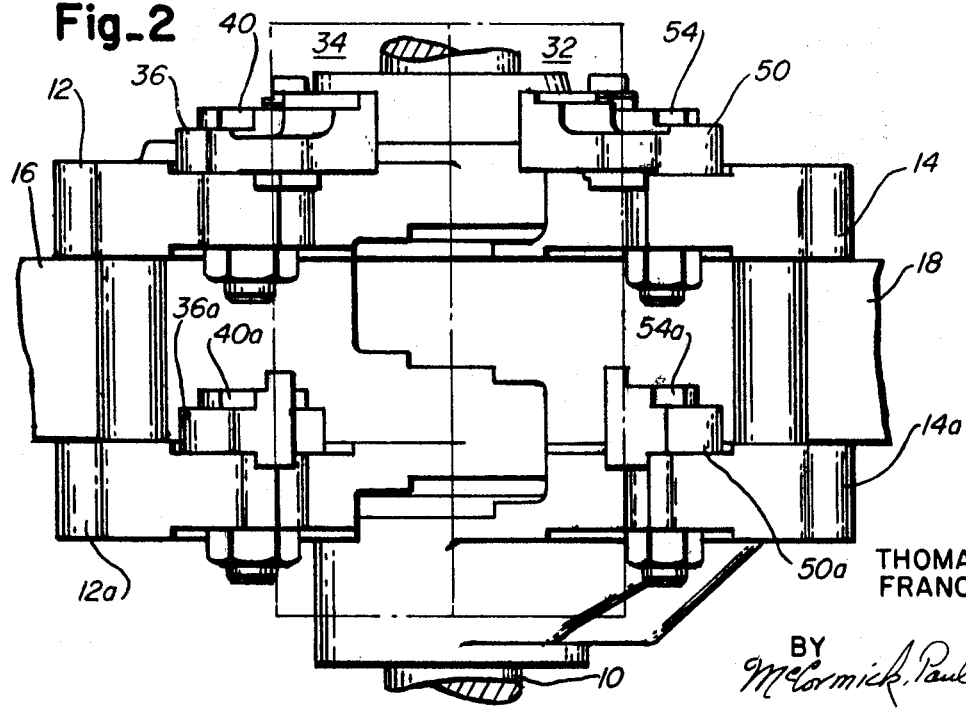
Fig_2
INVENTORS
THOMAS V. FOSTER
FRANCIS A. DAHMS
BY McCormick, Paulding & Huber
ATTORNEY

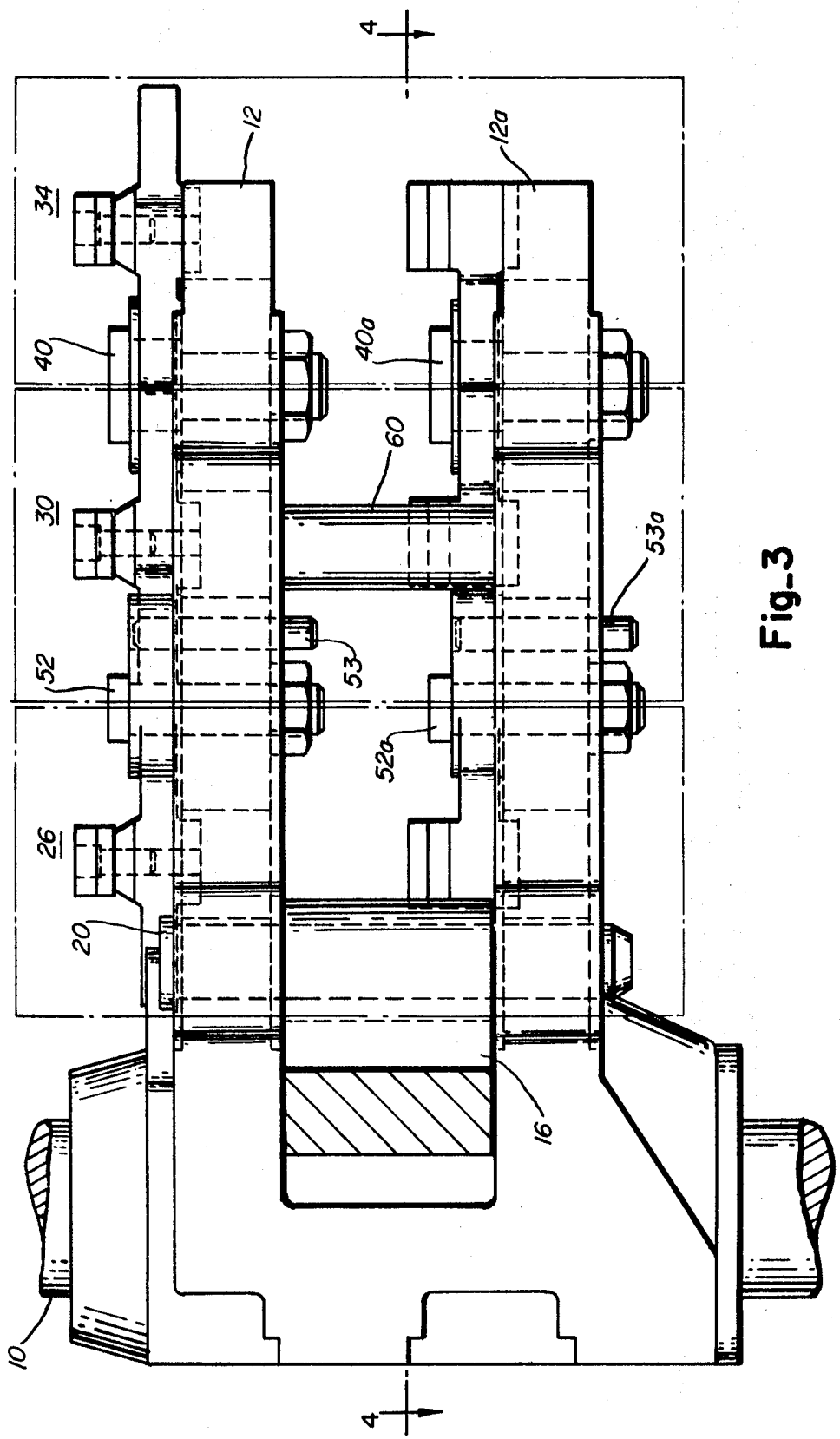
Fig_3

INVENTORS
THOMAS V. FOSTER
FRANCIS A. DAHMS

BY *McCormick, Paulding & Huber*
ATTORNEY

TRIPLE GOB MOLD HOLDER ARM CONSTRUCTION

SUMMARY OF INVENTION

This invention relates to triple-gob mold holders for a Hartford I. S. type glassware-forming machine, and deals more particularly with an improved mold holder arm construction for such a triple-gob machine.

A general object of the present invention is to provide an improved triple-gob mold holder arm construction wherein the three mold cavities are defined by split mold sections which can be closed tightly against one another although not necessarily in precise alignment as they are so closed.

A more specific object of the present invention is to provide an improved triple-gob mold holder arm construction of the type having two pivotally mounted mold holder arms, the three mold cavities being defined on a line running through the pivot axis of these arms, and the three mold cavities being defined by split mold sections one of which sections associated with each cavity being mounted for limited floating movement with respect to its associated split mold section on the opposite arm, whereby wear on all of the split mold sections occurs uniformly with respect to one another.

BRIEF DESCRIPTION OF THE DRAWINGS

FIG. 1 is a plan view of the blow mold side of a triple-gob Hartford I. S. type glassware-forming machine, with the primary mold holder arms being shown in their closed positions.

FIG. 2 is an end view taken from the right-hand end of the apparatus shown in FIG. 1, with the split mold sections being shown in phantom lines.

FIG. 3 is an elevational view of the apparatus shown in FIG. 1 with the split mold sections being shown in phantom lines.

DETAILED DESCRIPTION

Figure 4:
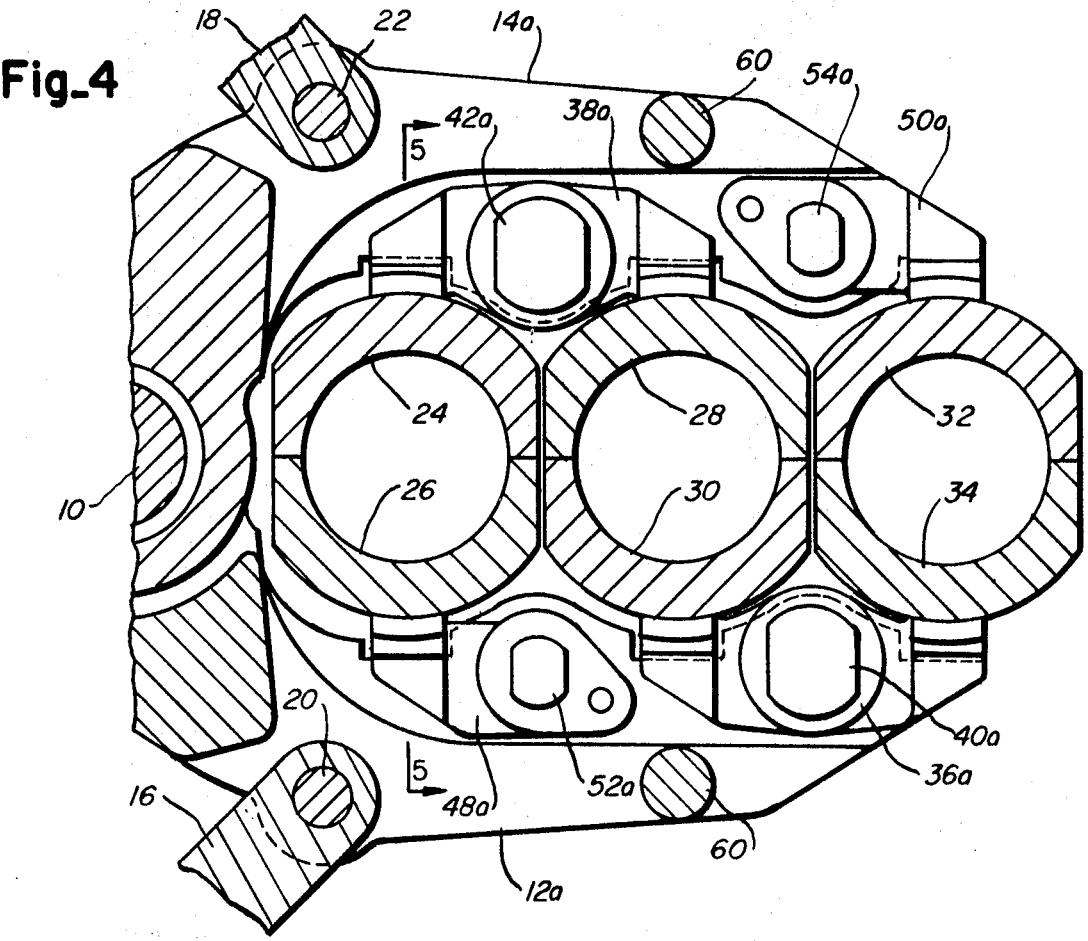
FIG. 4 is a horizontal sectional view taken on he line 4—4 of FIG. 3 showing the split mold sections in full lines.

Turning now to the drawings in greater detail, FIG. 1 shows a blow mold hinge pin 10 having a pair of primary mold holder arms 12 and 14 pivotally mounted thereon for movement between the closed position shown, and an open position, in response to actuation of the crank arms 16 and 18, connected to the arms 12 and 14 respectively by pins 20 and 22. The reader is referred to U.S. Pat. No. 1,911,119 issued to Ingle, May 23, 1933 for a more complete disclosure of the mechanism and means for opening and closing the mold holder arms 12 and 14 in timed relationship with movement of the various other components of a glassware-forming machine of the so called Hartford I. S. type. For purposes of the present application it is sufficient to note that these crank arms 16 and 18 serve to close the primary mold holder arms 12 and 14 after three glass parisons have been transferred to a position wherein the split mold sections 24, 26, 28, 30, 32, and 34 can be closed against one another to surround the glass parisons or blanks. At the blow mold station shown the three blanks are expanded to final shape filling the cavity defined by each of the cooperating mold sections in the manner described in the foregoing patent.

Figure 5:
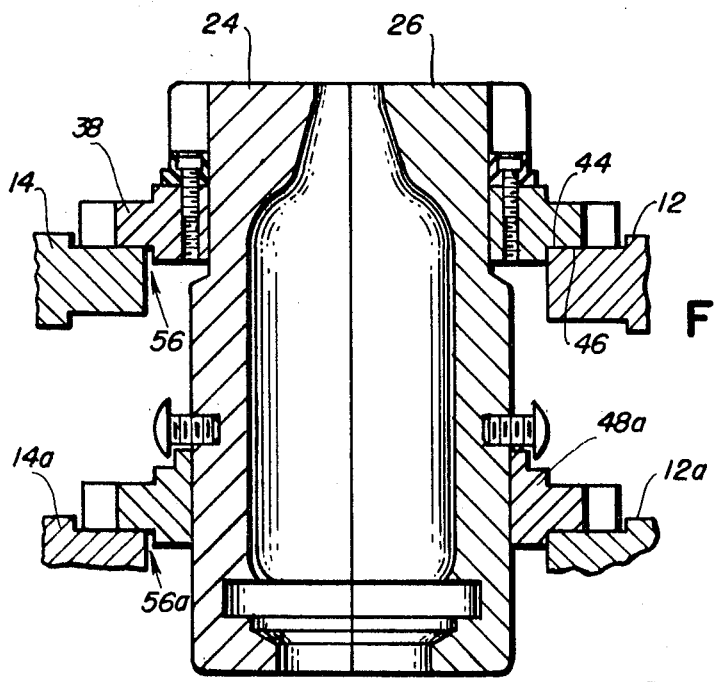
FIG. 5 is a vertical sectional view taken on the line 5—5 of FIG. 4.

In accordance with the present invention, at least one of the three split mold sections associated with each of the primary mold holder arms is supported in fixed relationship to these arms by identical primary mold holder arm inserts 48 and 50 as best shown in FIG. 1. The primary mold holder arm inserts 12 carries the insert 48 on a bolt 52 and pin 53, whereas the opposite primary mold holder arm 14 carries its associated insert 50 adjacent its outer end on a bolt 54 and pin 55. As best shown in FIG. 5 the insert 48 is not supported solely by means of the bolt 52 and pin 53, but the arm 12 includes a relieved surface 44 which cooperates with a complementary surface 46 on the insert 48 to prevent pivotal movement of the insert 48 with respect to the primary mold holder arm 12 about the axis of the bolt 52. The insert 50 associated with the primary mold arm 14 is similarly constructed, said insert 50 having a flange which abuts a complementary surface on the mold holder arm 14 to prevent relative movement between the insert 50 and the arm 14 in the manner just described.

In further accordance with he present invention, each of the primary mold holder arms 12 and 14 has associated therewith a secondary mold holder arm, 36 and 38 respectively, adapted for limited pivotal, or floating movement, with respect thereto about the axis of an associated rather large diameter bolt, 40 and 42 respectively. The pivotally mounted secondary mold holder arms each carry a pair of split mold sections 30—34 and 24—28, which sections cooperate with the mold sections on the opposite primary mold holder arm, to allow limited pivotal floating movement of the former with respect to the latter during closing movement of the primary mold holder arms. In fact, the sections 28 and 30 associated with the center cavity are both pivotally mounted. As best shown in FIG. 5, the floating movement of the secondary arm 38 with respect to the primary arm 14 is limited by a gap 56 defined by associated complementary flanges on the primary arm 14 and the secondary arm 38. Thus, the secondary mold holder arms 36 and 38 are pivotally mounted to their associated primary arms, 12 and 14 respectively, for limited floating movement about pivot axes defined by the bolts, 40 and 42 respectively. More particularly, the bolt 42 is located between the center cavity defining mold sections, 28 and 30, and the cavity defined by the mold sections adjacent the hinge pin, 24 and 26, whereas the other bolt 40 defines a pivot axis located between the center mold sections, 28 and 30, and the sections, 32 and 34, most remote from the hinge pin. Conversely, the bolts 52 and 50, associated with the fixed inserts 48 and 50 respectively, are arranged opposite the pivot bolts 42 and 40 just described to provide a generally symmetrical mold holder arm construction as depicted in FIGS. 1 and 3.

It will be apparent to those skilled in the art to which the present invention pertains that a single primary mold holder arm construction might be used to advantage for opening and closing split mold sections having a limited vertical height. However, in the embodiment shown an upper and a lower mold holder arm construction has been disclosed with the subscript $a$ indicating in FIGS. 2, 3, 4 and 5 the lower parts corresponding to the upper parts already described with reference to FIG. 1. This feature of the present invention need not be described in detail herein since it does comprise a well-known expedient commonly used to support relatively tall glassware molds of the type depicted herein. However, and with particular reference to FIG. 3 it is noted that the upper and lower mold holder arms, 12 and 12$a$, are pinned together intermediate their pivoted and free ends by a pin 60.

We claim:

1. In a glassware-forming machine of the type having six individual split mold sections arranged in left and right hand sets to define three mold cavities when closed against one another, the improvement comprising left and right hand primary mold holder arms pivotally mounted adjacent their inner ends for movement toward and away from one another, a first insert member mounted to said left primary arm and supporting one left-hand mold section in fixed relationship to said left primary arm adjacent said inner pivoted end thereof, a second insert member mounted to said right primary arm and supporting one right-hand mold section in fixed relationship to said right primary arm adjacent the outer free end thereof, a left equalizer bar pivotally mounted to said left primary arm and defining inserts for receiving two left-hand mold sections, one of said two sections being oriented adjacent the outer free end of said left primary arm and opposite said one right-hand mold section, a right equalizer bar pivotally mounted to said right primary arm and defining inserts for receiving two right-hand mold sections, one of said two right-hand sections being oriented adjacent the inner pivoted end of said right primary arm and opposite said one left-hand mold section, said other left and right hand mold sections of said two left and right mold sections respectively being oriented opposite one another to define a center mold cavity when said primary arms are moved inwardly to close said mold sections.